United States Patent
Johnson et al.

(10) Patent No.: US 12,198,722 B2
(45) Date of Patent: Jan. 14, 2025

(54) ENHANCING SPIN UP AND SPIN DOWN TIMES FOR DATA STORAGE DEVICES

(71) Applicant: Western Digital Technologies, Inc., San Jose, CA (US)

(72) Inventors: Brian Johnson, Laguna Hills, CA (US); Ryan Mayo, Aliso Viejo, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 18/447,976

(22) Filed: Aug. 10, 2023

(65) Prior Publication Data

US 2024/0379123 A1 Nov. 14, 2024

Related U.S. Application Data

(60) Provisional application No. 63/500,855, filed on May 8, 2023.

(51) Int. Cl.
G11B 19/20 (2006.01)
G11B 19/28 (2006.01)

(52) U.S. Cl.
CPC ...... *G11B 19/2054* (2013.01); *G11B 19/2063* (2013.01); *G11B 19/28* (2013.01)

(58) Field of Classification Search
None
See application file for complete search history.

(56) References Cited

U.S. PATENT DOCUMENTS

| 5,870,363 | A | * | 2/1999 | Sun | G11B 19/24 |
| 8,767,354 | B1 | * | 7/2014 | Ferris | G11B 5/40 |
| | | | | | 365/228 |
| 2002/0006007 | A1 | * | 1/2002 | Ataee | G11B 5/54 |
| 2008/0037164 | A1 | * | 2/2008 | Oh | G11B 33/144 |
| 2008/0231218 | A1 | * | 9/2008 | Oh | G11B 19/28 |
| | | | | | 318/400.11 |
| 2017/0092310 | A1 | * | 3/2017 | Ferris | G11B 5/5565 |

* cited by examiner

*Primary Examiner* — Peter Vincent Agustin
(74) *Attorney, Agent, or Firm* — Neugeboren O'Dowd PC

(57) ABSTRACT

A disk drive may include a disk, a head actuated over the disk, a spindle motor comprising a plurality of windings and operable to rotate the disk and coupled to a first and a second spindle driver, the first and the second spindle driver coupled in parallel to the plurality of windings. The disk drive further includes one or more processing devices that are configured to detect a BEMF signal corresponding to a velocity and/or a position of the spindle motor, control, based on detecting the BEMF signal, commutation of the plurality of windings of the spindle motor using the first and the second spindle driver, and wherein the plurality of windings are commutated at or near the same time or in a sequential manner during one or more of a spin up and a spin down routine of the spindle motor.

26 Claims, 9 Drawing Sheets

ENHANCING SPIN UP AND SPIN DOWN TIMES FOR DATA STORAGE DEVICES

CLAIM OF PRIORITY UNDER 35 U.S.C. § 120

The present Application for Patent claims priority to Provisional Application No. 63/500,855 entitled "ENHANCING SPIN UP AND SPIN DOWN TIMES FOR DATA STORAGE DEVICES" filed May 8, 2023, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges 60-6N recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge 6; (where 'i' ranges from 1 to N) comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during read/write operations. A position error signal (PES) is generated by reading the servo bursts 14, where the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some aspects, the techniques described herein relate to a disk drive including: a disk; a head actuated over the disk; a spindle motor operable to rotate the disk, wherein the spindle motor includes a plurality of windings and is coupled to a first spindle driver and a second spindle driver, and wherein the first and the second spindle driver are coupled in parallel to the plurality of windings; and one or more processing devices configured to: detect a back electromotive force (BEMF) signal corresponding to one or more of a velocity and a position of the spindle motor; and control, based at least in part on detecting the BEMF signal, commutation of the plurality of windings of the spindle motor using the first spindle driver and the second spindle driver, and wherein the first spindle driver and the second spindle driver, commutate the plurality of windings at or near the same time during one or more of a spin up routine, a spin down routine, and an at-speed routine of the spindle motor; or sequentially commutate the plurality of windings during one or more of the spin up and the spin down routine of the spindle motor.

In some aspects, the techniques described herein relate to a disk drive, wherein the one or more processing devices further include a system on chip (SoC), and wherein the SoC is configured to communicate with a first power large scale integrated circuit (PLSI) associated with the first spindle driver and a second PLSI associated with the second spindle driver.

In some aspects, the techniques described herein relate to a disk drive, wherein each of the first PLSI and the second PLSI include a serial port that is communicatively coupled to a serial port of the SoC.

In some aspects, the techniques described herein relate to a disk drive, wherein the one or more processing devices are further configured to: calibrate firmware (FW) to allow the first spindle driver and the second spindle driver to be controlled open-loop using the SoC.

In some aspects, the techniques described herein relate to a disk drive, wherein the first spindle driver includes a plurality of sets of commutation switches, and wherein each set of commutation switches of the first spindle driver includes at least two commutation switches and is coupled to one winding of the plurality of windings.

In some aspects, the techniques described herein relate to a disk drive, wherein the second spindle driver includes a plurality of sets of commutation switches, and wherein each set of commutation switches of the second spindle driver includes at least two commutation switches and is coupled to one winding of the plurality of windings.

In some aspects, the techniques described herein relate to a disk drive, wherein the spindle motor includes three windings, and wherein each of the first spindle driver and the second spindle driver include three pairs of commutation switches, and wherein, each pair of commutation switches of the first and the second spindle drivers is connected to a first end of one winding of the spindle motor, and a second end of each winding of the spindle motor is connected to a center tap. In some embodiments, each pair of commutation switches may comprise a half-bridge of commutation switches. Further, a center-point of each half-bridge of commutation switches may be coupled to one end of a respective winding of the spindle motor. In some cases, each winding may correspond to one phase of the multi-phase spindle motor (e.g., 3-phase spindle motor).

In some aspects, the techniques described herein relate to a disk drive, wherein the first spindle driver includes a spindle driver of a lead power large scale integrated circuit (PLSI) and the second spindle driver includes a spindle driver of a support PLSI.

In some aspects, the techniques described herein relate to a disk drive, wherein the lead PLSI includes a plurality of output pins and the support PLSI includes a plurality of input pins.

In some aspects, the techniques described herein relate to a disk drive, wherein a number of output pins of the lead PLSI is equal to a number of input pins of the support PLSI, and wherein each output pin is tied to one input pin to produce a tied pin pair.

In some aspects, the techniques described herein relate to a disk drive, wherein the first spindle driver and the second spindle driver include a same number of pairs of commutation switches, and wherein the number of output pins and the number of input pins is one of: equal to one or more of a number of windings of the spindle motor and the number of pairs of commutation switches, or greater than a number of windings of the spindle motor.

In some aspects, the techniques described herein relate to a disk drive, wherein the spindle motor includes three windings, and each of the first spindle driver and the second spindle driver include three pairs of commutation switches, each pair of commutation switches coupled to one winding of the spindle motor.

In some aspects, the techniques described herein relate to a disk drive, wherein one of: the lead PLSI includes three output pins and the support PLSI includes three input pins, one output pin for each pair of commutation switches in the first spindle driver and one input pin for each pair of commutation switches in the second spindle driver; or the lead PLSI includes six output pins and the support PLSI includes six input pins, one output pin for each commutation switch in the first spindle driver and one input pin for each commutation switch in the second spindle driver.

In some aspects, the techniques described herein relate to a disk drive, wherein one or more of: a high signal on a tied pin pair indicates that a commutation switch on a high-side of a corresponding pair of commutation switches should be driven to an ON state and a commutation switch on a low-side of the corresponding pair of commutation switches should be driven to an OFF state; a low signal on a tied pin pair indicates that a commutation switch on a high-side of a corresponding pair of commutation switches should be driven to an OFF state and a commutation switch on a low-side of the corresponding pair of commutation switches should be driven to an ON state; and a mid-signal on a tied pin pair places a corresponding pair of commutation switches into a tri-state.

In some aspects, the techniques described herein relate to a disk drive, wherein the first spindle driver of the lead PLSI and the second spindle driver of the support PLSI are driven in parallel and controlled closed-loop, based at least in part on the BEMF signal.

In some aspects, the techniques described herein relate to a method for operating a data storage device, the method including: coupling a first spindle driver and a second spindle driver to a spindle motor, wherein the spindle motor includes a plurality of windings, and wherein the first and the second spindle driver are coupled in parallel to the plurality of windings; detecting a back electromotive force (BEMF) signal corresponding to one or more of a velocity and a position of the spindle motor; controlling, based at least in part on detecting the BEMF signal, commutation of the plurality of windings of the spindle motor using the first spindle driver and the second spindle driver, and wherein the first spindle driver and the second spindle driver, commutate the plurality of windings at or near the same time during one or more of a spin up routine, a spin down routine, and an at-speed routine of the spindle motor; or sequentially commutate the plurality of windings during one or more of the spin up and the spin down routine of the spindle motor.

In some aspects, the techniques described herein relate to a method, wherein the data storage device further includes a system on chip (SoC) for communicating with a first power large scale integrated circuit (PLSI) associated with the first spindle driver and a second PLSI associated with the second spindle driver, the method further including: calibrating firmware (FW) to enable the first and the second spindle drivers to be controlled open-loop using the SoC.

In some aspects, the techniques described herein relate to a method, wherein the first spindle driver and the second spindle driver are controlled closed-loop, and wherein the controlling includes driving the first spindle driver and the second spindle driver in parallel.

In some aspects, the techniques described herein relate to one or more processing devices, including: means for detecting a back electromotive force (BEMF) signal corresponding to one or more of a velocity and a position of a spindle motor of a data storage device, wherein the spindle motor includes a plurality of windings, and wherein the data storage device includes a first spindle driver and a second spindle driver coupled in parallel to the plurality of windings; and means for controlling commutation of the plurality of windings of the spindle motor using the first spindle driver and the second spindle driver, and wherein the first spindle driver and the second spindle driver, commutate the plurality of windings at or near the same time during one or more of a spin up routine, a spin down routine, and an at-speed routine of the spindle motor; or sequentially commutate the plurality of windings during one or more of the spin up and the spin down routine of the spindle motor; and wherein the first and the second spindle driver are controlled, based at least in part on detecting the BEMF signal.

In some aspects, the techniques described herein relate to one or more processing devices, wherein the means for controlling includes one of: means for controlling the first and the second spindle driver using an open-loop control scheme; and means for controlling the first and the second spindle driver using a closed-loop control scheme.

In some aspects of the data storage device, the method, and the one or more processing devices described above, between the actions of (1) commutating the plurality of windings at or near the same time during one or more of a spin up routine, a spin down routine, and an at-speed routine of the spindle motor, and (2) sequentially commutating the plurality of windings of windings during one or more of the spin up and the spin down routine of the spindle motor, the one or more processing devices is further configured to control using the first spindle driver and the second spindle driver to perform action (1).

In some aspects of the data storage device, the method, and the one or more processing devices described above, between the actions of (1) commutating the plurality of windings at or near the same time during one or more of a spin up routine, a spin down routine, and an at-speed routine of the spindle motor, and (2) sequentially commutating the plurality of windings of windings during one or more of the spin up and the spin down routine of the spindle motor, the one or more processing devices is further configured to control using the first spindle driver and the second spindle driver to perform action (2).

In some aspects of the data storage device, the method, and the one or more processing devices described above, between the actions of (1) commutating the plurality of windings at or near the same time during one or more of a spin up routine, a spin down routine, and an at-speed routine of the spindle motor, and (2) sequentially commutating the plurality of windings of windings during one or more of the spin up and the spin down routine of the spindle motor, the one or more processing devices is further configured to control using the first spindle driver and the second spindle driver to perform actions (1) and (2).

In some aspects of the data storage device, the method, and the one or more processing devices described above, between the actions of (1) commutating the plurality of windings at or near the same time during one or more of a spin up routine, a spin down routine, and an at-speed routine of the spindle motor, and (2) sequentially commutating the plurality of windings of windings during one or more of the spin up and the spin down routine of the spindle motor, the one or more processing devices is further configured to control using the first spindle driver and the second spindle driver to perform actions (1) and/or (2).

Thus, in some aspects, the data storage device described herein may switch between commutating the plurality of windings of the spindle motor at or near the same time, e.g., for a first cycle, and sequentially commutating the plurality of windings of the spindle motor, e.g., for a second cycle.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

Disk drives typically employ a multi-phase spindle motor (e.g., a 3-phase spindle motor) for spinning a disk while a head writes data to and reads data from the disk. The head is connected to a distal end of an actuator arm which is rotated about a pivot by a voice coil motor (VCM) in order to actuate the head radially over the disk to access radially spaced, concentric tracks. The disk drive receives power from a host computer (e.g., host 25 in FIG. 2A), including a first power supply (e.g., 12V supply) for powering the spindle motor 210 and VCM 20, and a second power supply (e.g., 5V supply) for powering the integrated circuits that control the operation of the disk drive. In some examples, the amount of current that can be drawn by the disk drive from either supply may be limited so as not to interfere with the proper operation of the host computer 25.

Figure 1:
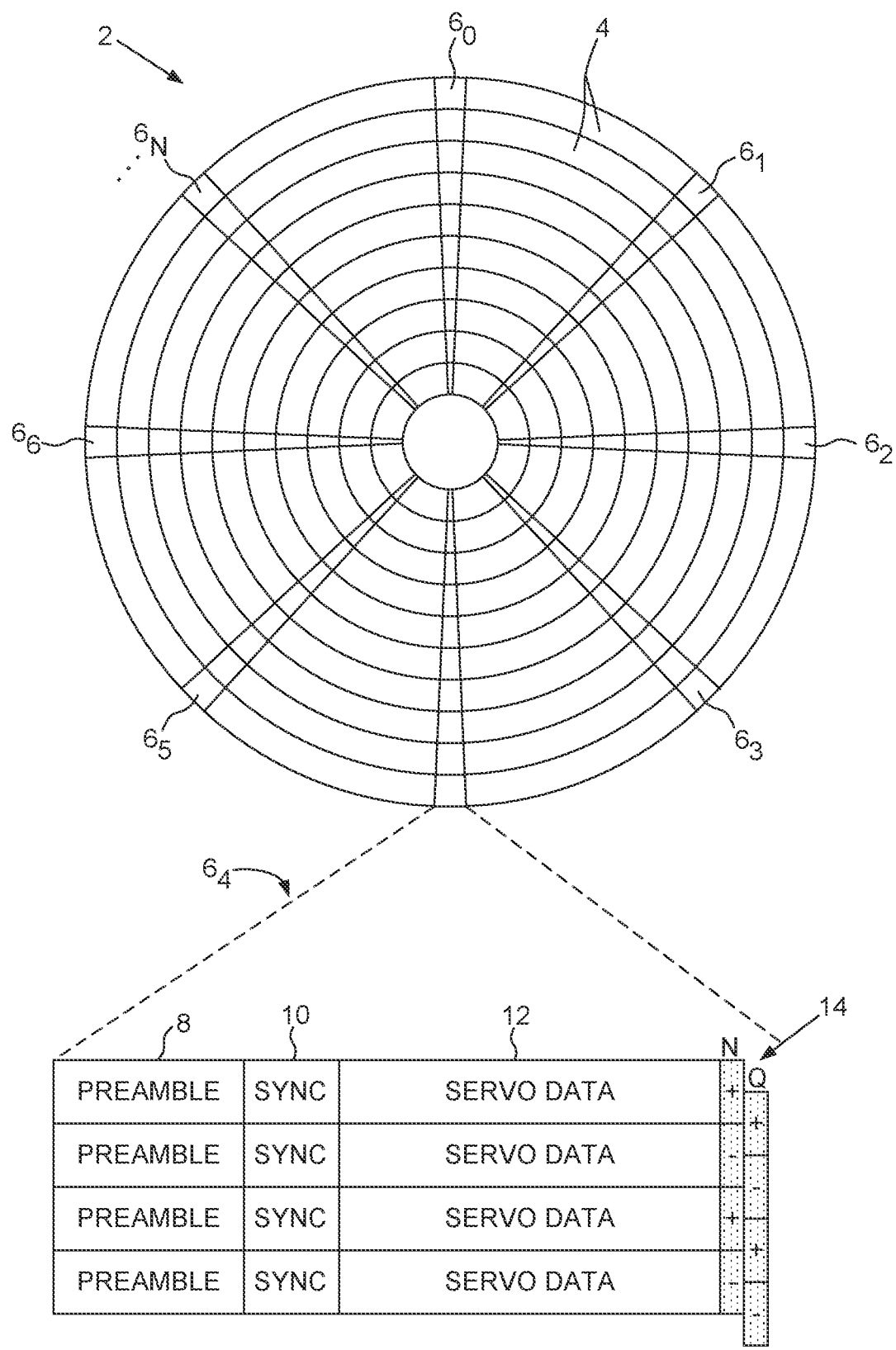
FIG. 1 shows a disk format as comprising a number of radially-spaced, concentric servo tracks defined by servo wedges recorded around the circumference of each servo track, according to various aspects of the present disclosure.
Figure 2A:
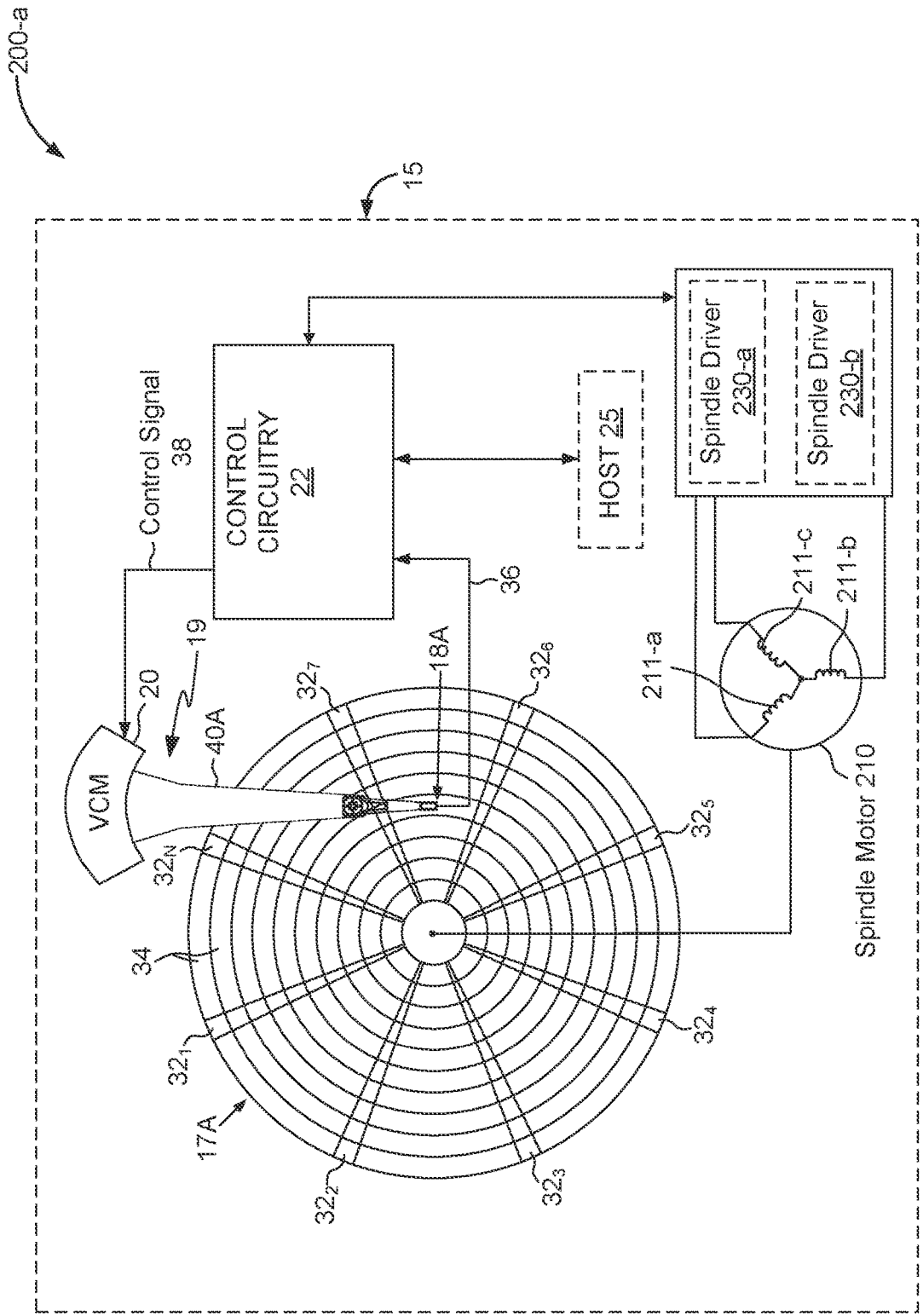
FIG. 2A illustrates a conceptual block diagram of a top view of a data storage device in the form of a disk drive comprising a head actuated over a disk, a spindle motor comprising a plurality of windings, and a control circuitry configured to effectuate one or more aspects of the present disclosure.
Figure 2B:
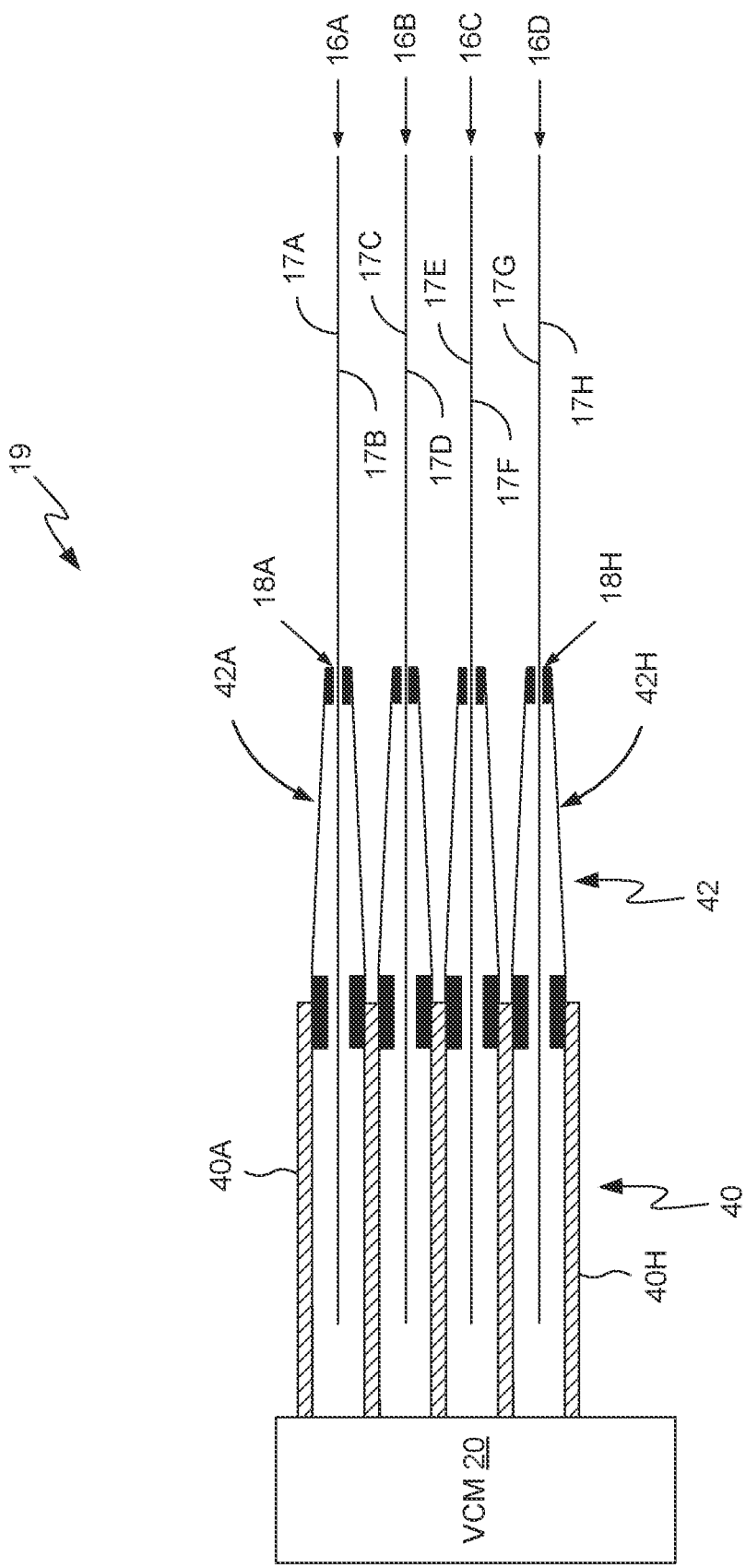
FIG. 2B illustrates a conceptual block diagram of a side view of the data storage device in FIG. 2A, according to various aspects of the present disclosure.

The disk(s) 16, such as disks 16A through 16D in FIG. 2B, are typically rotated by a spindle motor 210 at a high speed so that an air bearing forms between the head 18 and the disk surface 17. In some cases, a commutation controller (e.g., of the control circuitry 22) applies a drive signal to the windings 211 (e.g., windings 211-*a*, 211-*b*, 211-*c*) of the spindle motor 210 using a particular commutation sequence in order to generate a rotating magnetic field that causes the spindle motor 210 to rotate. In some cases, the commutation of the windings can be controlled by measuring a zero-crossing frequency of a back electromotive force (BEMF) voltage generated by the windings 211 of the spindle motor 210, although other techniques are also contemplated in different embodiments. For instance, in some cases, a BEMF voltage generated by the windings of the spindle motor 210 may be processed in order to drive the commutation sequence of the commutation controller. In another example, the commutation sequence may be driven based on data recorded on the disk(s) 16, such as servo sectors 321 through 32N that define the servo tracks.

Broadly, aspects of the present disclosure are directed to connecting two or more spindle drivers of a data storage device in parallel to provide higher spin up and spin down currents, which in turn facilitates faster spin and spin down times, as compared to the prior art. Some aspects of the present disclosure are also directed to optimizing spindle motor efficiency by employing a plurality of spindle drivers in parallel, which helps reduce the current drawn by each driver during normal operation of the disk drive, as described in further detail below. For example, when two or more spindle drivers are coupled in parallel to the windings of the spindle motor, the overall/cumulative resistance coupled to the windings is reduced (i.e., as compared to the case when a single spindle driver is connected), which also reduces the current drawn by the spindle drivers, and thereby helps enhance power efficiency.

In some cases, aspects of the present disclosure can be implemented in firmware (FW), as described below in relation to FIG. 3. Alternatively, aspects of the present disclosure can also be implemented using hardware (HW) modifications, further described in relation to FIG. 4. In yet other cases, spin up and spin down times may be enhanced through a combination of FW and HW modifications. While generally described in relation to enhancing spin and spin down times, aspects of the present disclosure can also help enhance power efficiency when the spindle motor is "at speed", i.e., rotating at a target RPM, by driving the plurality of spindle drivers in parallel.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16").

Figure 2C:
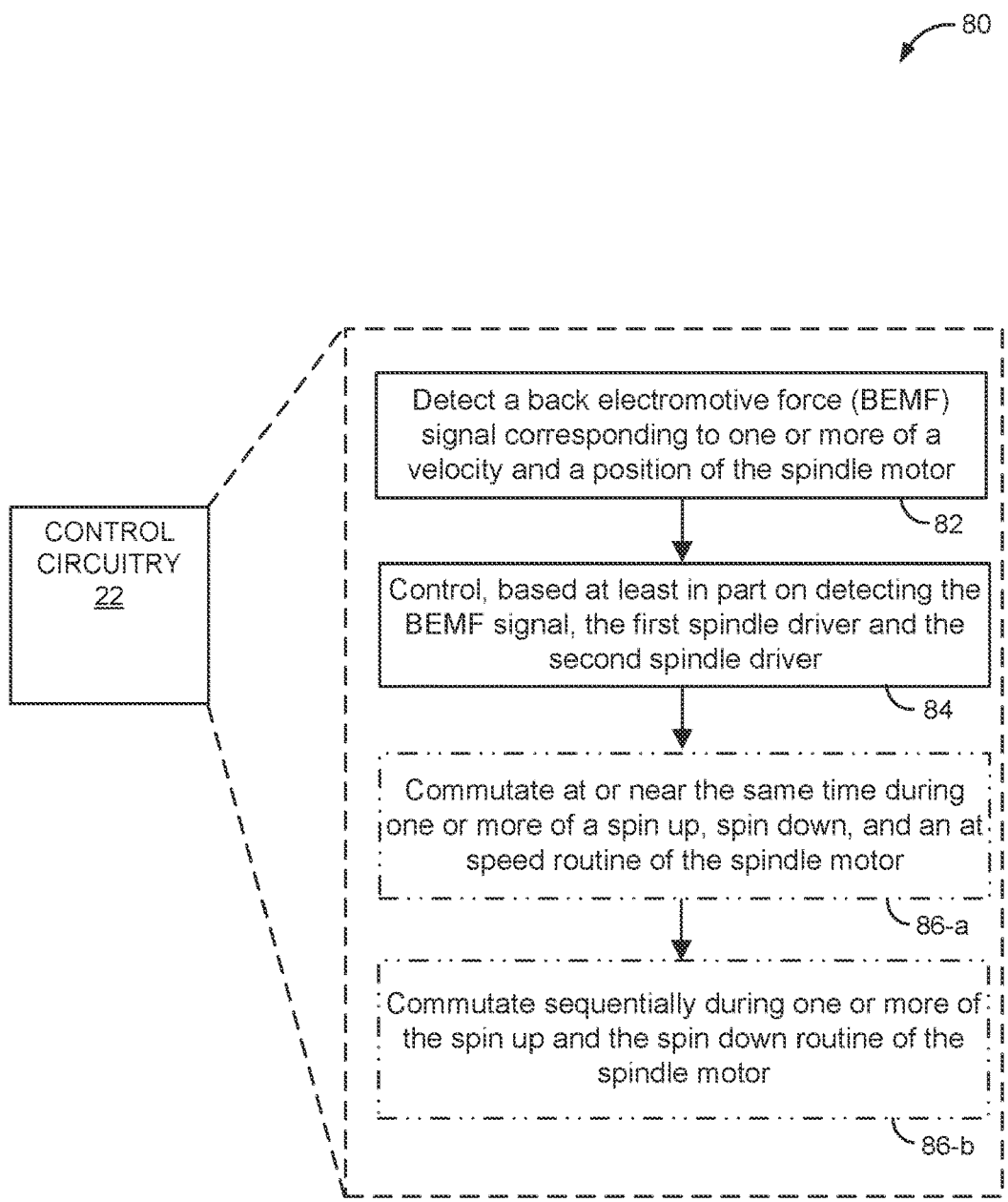
FIG. 2C illustrates an example of a method for enhancing spin and spin down times for a data storage device, according to various aspects of the disclosure.

FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, the operations of the spindle motor 210, and/or the operations of spindle drivers 230-a and 230-b, in accordance with aspects of the present disclosure, as further described below.

Each disk (shown as disks 16A-D) can have thin film magnetic material on each of the planar surfaces. Each recording surface may comprise a dedicated pair of read and write heads packaged in a slider that is mechanically positioned over the rotating disk by an actuator (e.g., shown as actuator assembly 19 in FIG. 2B). In some examples, the actuator(s) also provide the electrical connections to the components of the slider. The actuator assembly 19 may also comprise one or more preamps (e.g., read or write preamp) for the heads, write driver, read driver, and fly-height controls.

Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16. In some cases, the disk drive 15 according to various aspects of the disclosure comprises a system on a chip (SoC), where the SoC comprises the electronics and firmware for the disk drive 15. The SoC (e.g., SoC 350, SoC 450) may be used to control the functions of the disk drive 15 including providing power and/or control signals to the components of the disk drive. In some cases, the SoC may include the control circuitry 22. Alternatively, one or more aspects of the control circuitry 22 may be implemented in or using the SoC.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., head 18A in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 321 through 32N) written onto disk surfaces 17. In some examples, the servo sectors 32 (or servo wedges 32) on a disk drive may be curved, but for sake of illustration, the servo sectors 32 in FIG. 2A have been shown with straight lines. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing process In some examples, the control circuitry 22 is configured to control the actuation of the primary actuator (i.e., VCM 20). Further, the VCM 20 is configured to actuate the head 18 over the disk surfaces 17. The control circuitry 22 is further configured to control the spindle motor 210 via one or more of the spindle drivers 230-a and 230-b. In some embodiments, the spindle motor 210 is configured to rotate the disk 16. The spindle motor 210 comprises a plurality of windings, and the control circuitry 22 (or alternatively, the spindle drivers 230-a and/or 230-b) is configured to commutate the windings to generate a rotating magnetic field that causes the spindle motor 210 to rotate. In this example, the spindle motor 210 comprises three windings 211-a, 211-b, and 211-c, each coupled to the first and second spindle drivers 230-a and 230-b. In this example, the spindle drivers 230-a and 230-b are coupled in parallel to the windings 211 of the spindle motor 210.

As seen in method 80 in FIG. 2C, the control circuitry 22 is configured to detect a back electromotive force (BEMF) signal corresponding to one or more of a velocity and a position of the spindle motor (operation 82). At operation 84, the control circuitry 22 is further configured to control, based at least in part on detecting the BEMF signal, the first spindle driver (e.g., spindle driver 230-a) and the second spindle driver (e.g., spindle driver 230-b). In some cases, controlling the first spindle driver and the second spindle driver comprises commutating, at or near the same time, the windings of the spindle motor using both the first and the second spindle driver (operation 86-a). Alternatively, controlling the first spindle driver and the second spindle driver comprises commutating the windings of the spindle motor using the first spindle driver followed by the second spindle driver or vice versa (operation 86-b). That is, the control circuitry 22 is configured to control the first spindle driver and the second spindle driver to simultaneously commutate the windings of the spindle motor during one or more of the spin up routine, the spin down routine, and the at-speed routine (operation 86-a) or to sequentially commutate the windings of the spindle motor during one or more of the spin up and spin down routine of the spindle motor (operation 86-b). In some embodiments, the first spindle driver 230-a and the second spindle driver 230-b are coupled in parallel, as further described in relation to FIGS. 3 and/or 4. In some cases, the control circuitry 22 may also be configured to help reduce power consumption during an 'at speed' routine of the spindle motor 210, where the reduction in power consumption may be based at least in part on (1) reducing the overall resistance connected to the windings 211 of the spindle motor 210 (i.e., overall resistance is reduced when the two or more spindle drivers 230 are coupled in parallel to the spindle motor windings), and/or (2) reducing the current drawn by the spindle drivers.

In the embodiment of FIG. 2A, the control circuitry 22 may also process a read signal 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 (e.g., a VCM control signal) applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the BEMF voltage generated by the VCM 20 during a calibration seek (where the BEMF voltage represents an estimated velocity of the VCM). The bootstrap spiral track is then written to the disk using the feed-forward compensation. In some embodiments, the BEMF voltage representing the velocity of the VCM 20 may be sampled at any suitable sample rate in order to update the feed-forward compensation at any suitable frequency during seek operations.

It should be noted that spindle motor 210 may also generate a BEMF signal/voltage, which may be sampled to estimate one or more of the position and velocity/speed of the spindle motor 210.

Figure 3:
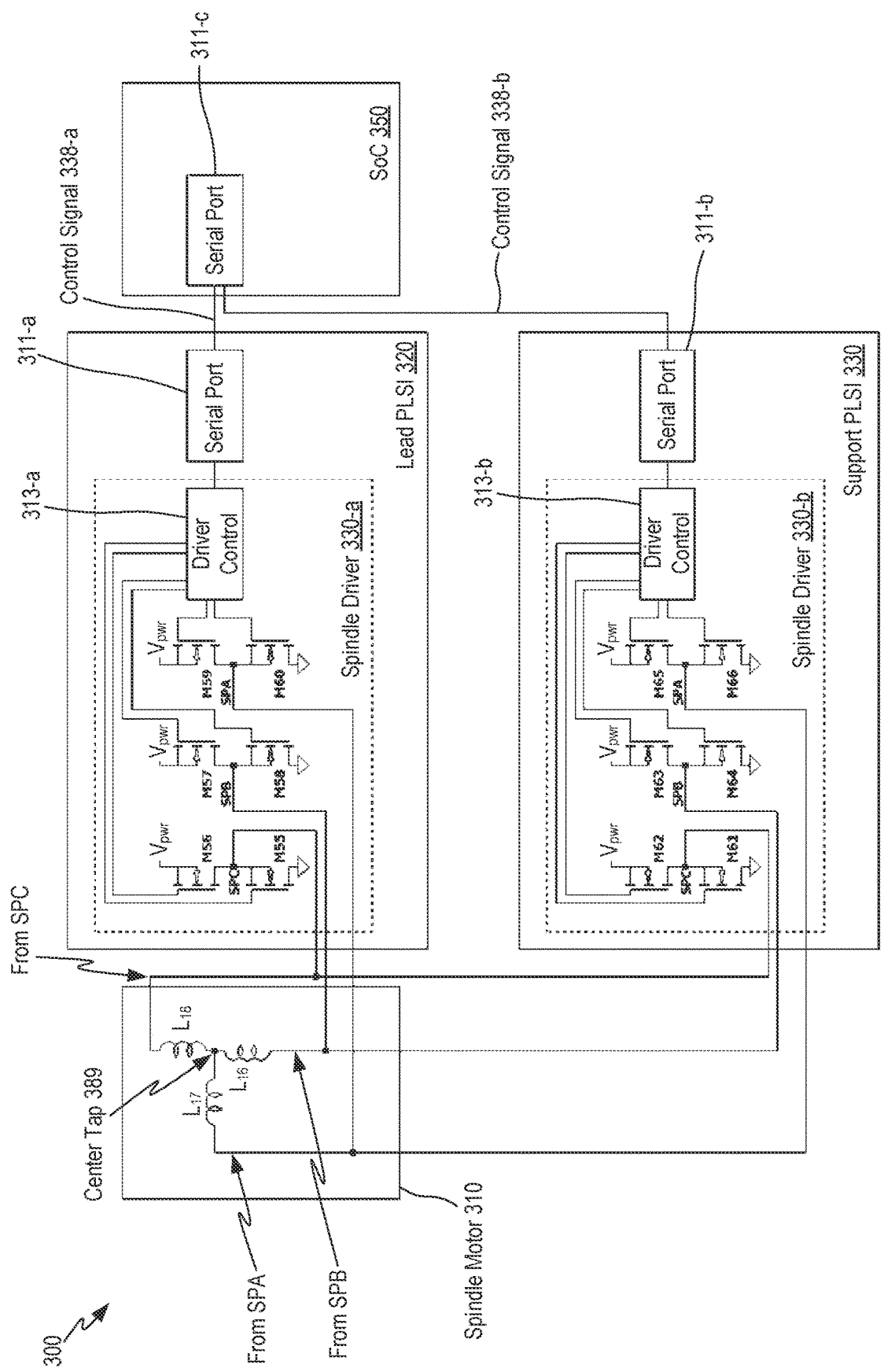
FIG. 3 illustrates a block diagram of a spindle motor of a data storage device, as well as control circuitry configured for enhancing spin up and spin down times, according to various aspects of the disclosure.

FIG. 3 illustrates a block diagram 300 of various components of a data storage device, such as data storage device 200-a in FIG. 2A, according to various aspects of the disclosure. Specifically, FIG. 3 illustrates a spindle motor 310, as well as control circuitry configured for enhancing spin up and spin down times, according to various aspects of the disclosure. Additionally, or alternatively, the control circuitry in FIG. 3 may be configured to help reduce power consumption during an 'at speed' routine for the spindle motor 310. The control circuitry may be similar or substantially similar to the control circuitry 22 described in relation to FIG. 2A, and may include the SoC 350, the lead PLSI 320, and the support PLSI 330.

In some cases, a data storage device comprises a spindle motor 310 for rotating or spinning a disk while a head (e.g., head 18A in FIG. 2A) writes data to and reads data from the disk. In some cases, the performance of a disk drive may be quantified using a few different performance metrics, some non-limiting examples of which include the spin up time (i.e., the amount of time required for the spindle motor 310 to spin up the disk to its operating RPM), the spin down time (i.e., amount of time required for the spindle motor 310 to brake or stop the disk from spinning, or amount of time required for the spindle 310 to brake the rotating disk from a higher RPM to a lower RPM), and/or the seek time (i.e., amount of time required for the VCM to position the head over a target track). As can be appreciated, a short spin-up period may not only help enhance user experience, but also satisfy the time-out restriction (if any) imposed by the host 25.

In some cases, the spindle motor 310 may be an example of a multi-phase spindle motor comprising a plurality of windings, each winding comprising a first end and a second end, where the second ends of each winding are connected together at a center tap 389. In some cases, the data storage device comprises a plurality of spindle drivers, each associated with a single power large scale integrated circuit (PLSI). For example, the data storage device shown in FIG. 3 comprises a lead PLSI 320 having a first spindle driver 330-a and a first serial port 311-a, and a support PLSI 330 having a second spindle driver 330-b and a second serial port 311-c.b The first spindle driver 330-a includes a first driver control module 313-a, and the second spindle driver 330-b includes a second driver control module 313-b. In some cases, the first and the second driver control modules 313-a, 313-b are coupled to a serial port 311-c of a system on chip (SoC) 350 via a respective serial port of a PLSI. In some cases, each spindle driver comprises a plurality of switch pairs (or half-bridge of switches), each switch pair coupled to one of the windings of the spindle motor 310, further described below. In some cases, each switch pair comprises a plurality of commutation switches (e.g., field effect transistors (FETs), such as metal-oxide semiconductor field effect transistors or MOSFETs).

As seen in FIG. 3, the spindle motor 310 comprises three windings, i.e., L16, L17, and L18 corresponding to three phases. It should be noted, however, that any suitable number of windings may be employed to implement any suitable multi-phase spindle motor, and the number of windings/phases described herein are not intended to be limiting. In the example shown, a first end of each of the windings is coupled to a center-point of one of the commutation switch pairs (i.e., half-bridge of switches) in the spindle driver 330-a. For example, a first end of the first winding, L17, is coupled between switches M59 and M60. Similarly, a first end of the second winding, L16, is coupled between switches M57 and M58, while a first end of the third winding, L18, is coupled between switches M56 and M55. In this example, the first end of the winding, L17, is also coupled to a center-point of the switch pair comprising switches M65 and M66 of the second spindle driver 330-b. Additionally, the first end of the winding, L16, is also coupled to a center-point of the switch pair comprising switches M63 and M64, and the first end of the winding, L18, is also coupled to a center point of the switch pair comprising switches M61 and M62. Furthermore, the second end of each of the windings L16, L17, and L18 are connected to a center tap 389. In this way, the first spindle driver 330-a and the second spindle driver 330-b are coupled in parallel to the windings of the spindle motor 310.

In some aspects, higher current capabilities (i.e., faster spin up and/or spin down times) and/or more optimal efficiency (i.e., for the same amount of current used) may be achievable by using two spindle drivers in parallel, as compared to the prior art. For instance, spindle run efficiency may be enhanced since the same amount of current can be split between the two spindle drivers 330-a and 330-b. That is, a reduction in power consumption can be seen when the two spindle drivers 330-a and 330-b are connected in parallel, as this parallel configuration serves to reduce the overall resistance coupled between the spindle motor 310 and the SoC 350. Additionally, aspects of the present disclosure also enable a higher current capability, as compared to the prior art, during one or more of a spin up, spin down, and/or at speed routine. For instance, if the spindle high side and low side field effect transistor (FET) drivers are limited to 3 amps, a total of 6 amps (e.g., for spin up and/or spin down) may be achievable when the two spindle drivers 330-a, 330-b are employed in a parallel configuration, in accordance with aspects of the present disclosure.

In some embodiments, the SoC 350 is configured to drive the spindle motor 310 via an open loop driving method. In one non-limiting example, the SoC 350 may command the two spindle drivers 330-a and 330-b to commutate the windings of the spindle motor 310 at the same time (e.g., simultaneously through the two SoC serial ports 311-a, 311-b), or in back-to-back communications (e.g., via one of the serial ports 311-a or 311-b at a time). In accordance with aspects of the present disclosure, the spin up routine and at speed routine may be open loop, in which case the SoC 350 is constantly commutating the windings of the spindle motor 310 through each position based upon the BEMF signal feedback. In some embodiments, the SoC 350 may send an advance signal through the serial port (e.g., serial port 311-a or serial port 311-b) into the driver control module (e.g., driver control module 313-a of the spindle driver 330-a, driver control module 313-b of the spindle driver 330-b) to commutate to the next profile step in the sine wave. For instance, the firmware (FW) in the SoC 350 receives the BEMF feedback signal, which allows it to estimate/measure the position and velocity of the spindle motor 310. Furthermore, the FW and/or the SoC 350 may adjust the advance/commutation update frequency to align with the increasing speed of the spindle motor (e.g., during spin up). In some cases, the advancing serves to move the profile through each step of the sine wave (or another profile, such as trapezoidal wave).

In some cases, the SoC 350 and/or the PLSIs (e.g., lead PLSI 320, support PLSI 330) are configured to control the switch pairs (e.g., switch pairs M56-M55, M57-M58, M59-M60, etc.) to commutate the windings of the spindle motor 310 in a two-phase, three-phase, hybrid two-phase/three-phase mode, or any other applicable mode. In some cases, the commutation logic employed by the spindle drivers 330-a and/or 330-b may operate in any suitable manner, for instance, by driving the switches as linear amplifiers that apply continuous-time sinusoidal voltages to the windings L16, L17, L18 of the spindle motor 310. In some other cases, the commutation logic may drive the switches of the spindle drivers 330 using pulse wide modulation (PWM), such as, but not limited to, a square wave PWM, trapezoidal PWM, or sinusoidal PWM. It should be noted that the commutation logic described herein is not intended to be limiting and any applicable commutation logic known or contemplated in the art may be utilized in different embodiments.

Regardless as to how the windings of the spindle motor 310 are driven, the SoC 350 generates the control signal(s) 338 (e.g., control signal 338-a, control signal 338-b) so that the windings are commutated at the correct periods, thereby generating the target rotating magnetic field that causes the spindle motor 310 to rotate. In one embodiment, the control circuitry or SoC 350 may generate a control signal 338 that controls the effective amplitude of the driving voltages (continuous or PWM), thereby controlling the speed of the spindle motor 310. In some cases, the SoC 350 provides the control signals 338-a, 338-b at or near the same time, which causes the spindle drivers 330-a and 330-b to also commutate the windings of the spindle motor at or near the same time. In this way, the spindle drivers 330-a and 330-b can be driven in parallel, which serves to enhance the spin up and/or spin down times, as compared to the prior art. In other cases, the SoC 350 may provide the control signal 338-a to the spindle driver and the control signal 338-b to the spindle driver 330-b at different times, which causes the windings of the spindle motor to be commutated sequentially, e.g., first by the spindle driver 330-a followed by the spindle driver 330-b or vice-versa. In some embodiments, when the first and the second spindle driver are driven in parallel, the control signal 338-a and the control signal 338-b may be the same. Alternatively, the first control signal 338-a may be different from the second control signal 338-b.

In one non-limiting example, the windings (e.g., windings L16, L17, L18) of the spindle motor 310 are connected to a BEMF detector (not shown) which detects threshold crossings (e.g., zero crossings) in the BEMF voltage generated by the windings with respect to the center tap 389. In some circumstances, the BEMF voltage is distorted when current is flowing through the windings. In such cases, one or more of the spindle drivers 330-a and 330-b supplies a signal to the BEMF detector identifying the "open" winding generating a valid BEMF signal. At each BEMF threshold crossing, the BEMF detector toggles a signal to generate a sin wave signal, a square wave signal, or any other applicable signal. The frequency of the BEMF threshold crossings and thus the frequency of the signal (e.g., square wave signal, sin wave signal) represent the speed of the spindle motor 310. In some embodiments, one or more of the SoC 350 and/or the driver control modules (e.g., driver control module 313-a of the lead PLSI 320) evaluates the signal (e.g., square wave signal) and adjusts the PWM signal in order to control the speed of the spindle motor 310. In some other cases, the spindle driver(s) 330 comprise suitable circuitry for generating the PWM signal internally in response to a speed error signal generated by the control circuitry 22. In some embodiments, the spindle driver(s) 330 may sense the current flowing through the windings of the spindle motor 310 and use current feedback to generate the PWM signal.

Figure 4:
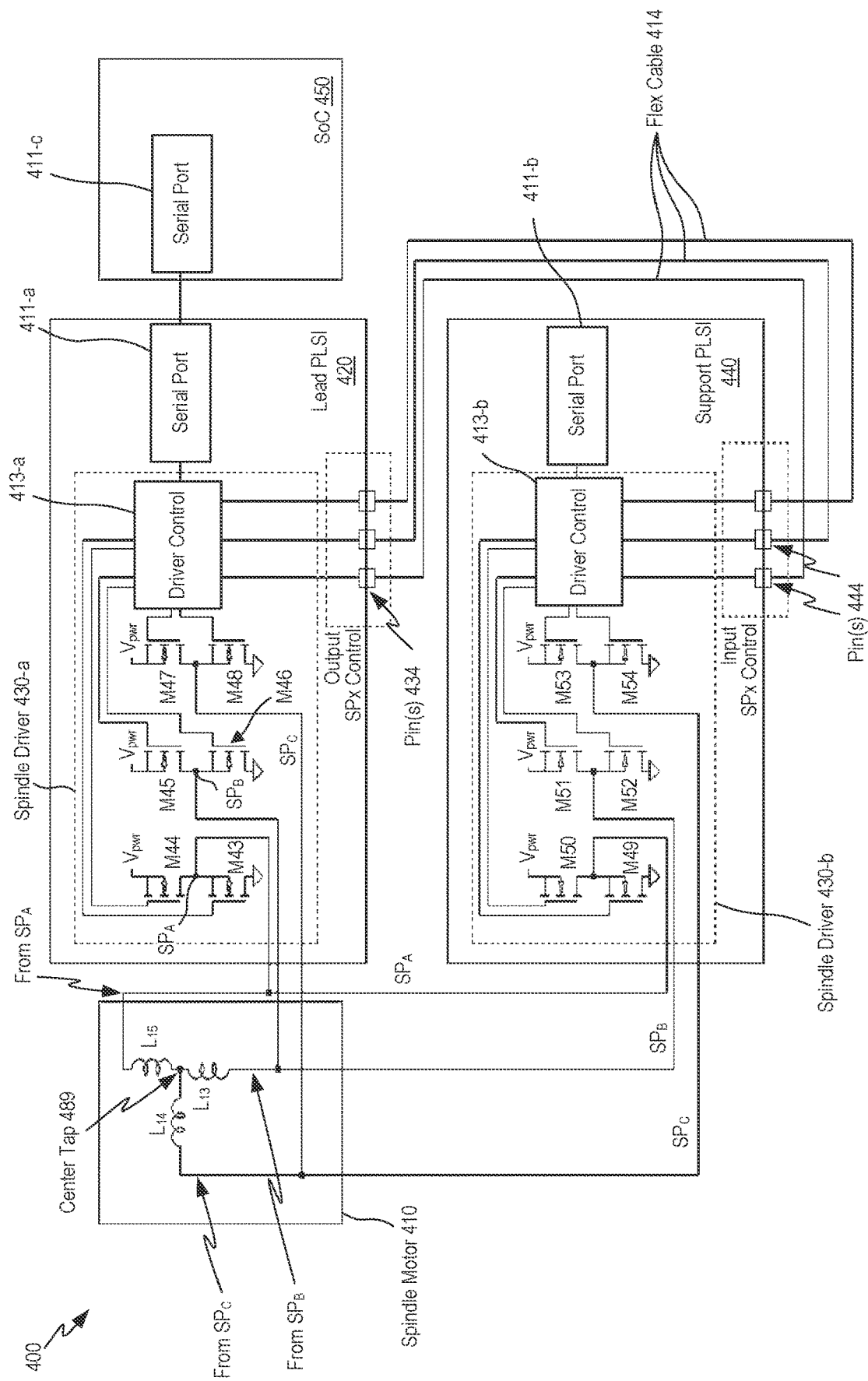
FIG. 4 illustrates another block diagram of a spindle motor of a data storage device, as well as control circuitry configured for enhancing spin and spin down times, according to various aspects of the disclosure.

FIG. 4 illustrates another block diagram 400 of various components of a data storage device, according to various aspects of the disclosure. Specifically, FIG. 4 illustrates a spindle motor 410, as well as control circuitry configured for enhancing spin up and spin down times, according to various aspects of the disclosure. Additionally, or alternatively, the control circuitry in FIG. 4 may be configured to help reduce power consumption during an 'at speed' routine for the spindle motor 410. The data storage device shown and described in relation to FIG. 4 implements one or more aspects of the data storage devices described herein, including at least in relation to FIGS. 2A and 3.

In some cases, the spindle motor 410 may be an example of a multi-phase spindle motor comprising a plurality of windings, each winding comprising a first end and a second end, where the second ends of each winding are connected together at a center tap 489. In some cases, the data storage device comprises a plurality of spindle drivers, each associated with one power large scale integrated circuit (PLSI). For example, the data storage device shown in FIG. 4 comprises a lead PLSI 420 having a first spindle driver 430-a and a first serial port 411-a, and a support PLSI 430 having a second spindle driver 430-b and a second serial port 411-b. The first spindle driver 430-a includes a first driver control module 413-a, and the second spindle driver 430-b includes a second driver control module 413-b. In some cases, the first and the second driver control modules 413-a, 413-b are coupled to a serial port 411-c of a system on chip (SoC) 450 via a respective serial port 411 of a PLSI. In some cases, each spindle driver 430 comprises a plurality of switch pairs, each switch pair coupled to one of the windings of the spindle motor 410, further described below. In some cases, each switch pair comprises a plurality of commutation switches (e.g., field effect transistors or FETs, such as MOSFETs).

As shown, the spindle motor 410 comprises three windings, i.e., L14, L13, and L15 corresponding to three phases. It should be noted, however, that any suitable number of windings may be employed to implement any suitable multi-phase spindle motor, and the number of windings/phases described herein are not intended to be limiting. In the example shown, a first end of each of the windings is coupled to a center-point of one of the commutation switch pairs in the spindle driver 430-a. For example, a first end of the winding, L14, is coupled between switches M47 and M48; a first end of the winding, L13, is coupled between switches M45 and M46; and a first end of the winding, L15, is coupled between switches M43 and M44.

In this example, the first end of the winding, L14, is also coupled to a center-point of the switch pair comprising switches M53 and M54 of the second spindle driver 430-b. Additionally, the first end of the winding, L15, is coupled to a center-point of the switch pair comprising switches M49 and M50; and the first end of the winding, L13, is coupled to a center point of the switch pair comprising switches M51 and M52. Furthermore, the second end of each of the windings L13, L14, and L15 are connected to a center tap 489, as shown in FIG. 4. In this way, the first spindle driver 430-a and the second spindle driver 430-b are connected in parallel to the windings of the spindle motor 410.

Some aspects of the present disclosure can be implemented using one or more hardware (HW) modifications, as further described below. In some embodiments, a plurality of pins may be added to both the lead PLSI 420 and the support PLSI 440. In the example shown, three pins 434 are added to the lead PLSI 420 and three pins 444 are added to the support PLSI 440. As seen in FIG. 4, the pins 434 of the lead PLSI are connected (or coupled) to the driver control module 413-a of the lead PLSI 420. Furthermore, the pins 434 of the lead PLSI 420 are also coupled to the pins 444 of the support PLSI 440 using one or more wire connections (e.g., flex cables 414). In some aspects, the pins 434 and pins 444 of the lead PLSI 420 and the support PLSI 440, respectively, are used to electrically, communicatively, and/or logically couple the driver control modules 413-a and 413-b. In the example shown in FIG. 4, one pin is provided for each switch pair of the lead and support PLSIs. It should be noted, however, that the number of pins added to each of the lead PLSI and the support PLSI 440 are not intended to be limiting. For instance, in some embodiments, more than three pins may be added to each of the lead PLSI 420 and the support PLSI 440. In one non-limiting example, six pins may be added to each of the lead and the support PLSI, for instance, one pin for each of the switches M43, M44, M45, M46, M47, M48 of the lead PLSI 420 and one pin for each of the switches M49, M50, M51, M52, M53, and M54 of the support PLSI 440.

In some cases, when the PLSI device is configured for support operation, such as support PLSI 440, the pins 444 may serve as the input for the spindle control FETs (e.g., FET or switches M49 through M54). Additionally, when the PLSI device is configured for lead operation, such as lead PLSI 420, the pins 434 may serve as the output for the support PLSI 440. In some embodiments, instead of having to commutate the lead and support spindle drivers in a sequential manner from the SoC serial port, the lead spindle driver may automatically drive the support spindle driver via control signals such that the support spindle driver mirrors (or, is in parallel with) the lead spindle driver.

In one non-limiting example, for the 3-pin configuration shown in FIG. 4, each pin corresponds to an output (e.g., $SP_A$, $SP_B$, $SP_C$) of one of the half bridge of commutation switches, where each output is connected to one of the windings (e.g., phase A winding, phase B winding, phase C winding) of the spindle motor 410. In other words, each pin corresponds to one of the windings (e.g., L13, L14, L15) or phases (e.g., phase A, phase B, phase C) of the spindle motor 410. In some cases, each half bridge of commutation switches may be set to one of three (3) conditions, where each condition further corresponds to a state of each pin. For example, a first condition may comprise the high side FET=ON, low side FET=OFF, a second condition may comprise the high side FET=OFF, low side FET=ON, and a third condition may comprise both the high side and low side FETs being tri-stated. Alternatively, the third condition may comprise both the high side and low side FETs being in the OFF state.

In some cases, a high signal (e.g., a control signal set to a high value) may be used to instruct the spindle driver control module 413-a to drive the high side FET (e.g., M44, M45, M47) of a corresponding spindle/winding (e.g., $SP_A$, $SP_B$, or $SP_C$) to an ON state, and the low side FET (e.g., M43, M46, M48) to an OFF state. Furthermore, a low signal (e.g., a control signal set to a low value) may be used to instruct the spindle driver control 413-a to drive the high side FET (e.g., M44, M45, M47) of a corresponding spindle/ winding (e.g., $SP_A$, $SP_B$, or $SP_C$) to an OFF state, and the low side FET (e.g., M43, M46, M48) to an ON state. In some embodiments, the SoC 450 provides an indication of these high and low signals to the driver control module 413-a of the lead PLSI 420 via the serial ports 411-c and 411-a. In some cases, a "mid" signal (e.g., control signal supply level/2, control signal at VIO/2) may be used to instruct the spindle driver control 413-a to tri-state the SPx driver, where SPx corresponds to one or more of $SP_A$, $SP_B$, and $SP_C$. As an example, if the control signal supply level can be varied from a high level (e.g., 1.8 volts) to a low level (e.g., 0 volts), then the mid level can be determined to be 1.8 volts/2=0.9 volts. It should be noted that the different control signals (e.g., high, low, mid-level control signals) discussed above can be repeated for each phase (e.g., phase A, phase B, phase C) of the spindle motor 410. In one non-limiting example, one control signal may be provided for each phase during normal operation (e.g., spin up, spin down, or at speed) of the disk drive. In some other cases, more than three (3) control signals (e.g., 6 signals, 9 signals) may be utilized, with less control function on each signal.

In some cases, the lead PLSI 420 is configured to control the commutation (of the windings), internally, in a closed loop from the BEMF feedback. As used herein, closed loop may imply that the internal PLSI hardware (of the lead PLSI 420) controls the advancing of the spindle motor driving profile based upon the BEMF feedback. In other words, the FW may not need to continually send in the advance signal to move through the spindle motor driving profile (i.e., to the next profile step, for instance, in the sine wave or trapezoidal wave). Additionally, or alternatively, the lead PLSI 420 is configured to send the driver output control signal to the plurality of pins 444 via the pins 434, which allows the support PLSI 440 to perform the same or similar operations described above. In this way, the two spindle drivers 430-a, 430-b can be driven in parallel.

In some aspects, the HW implementation described above in relation to FIG. 4 may allow for PLSI closed loop control, i.e., in lieu of the open loop driving method from the SoC firmware (FW), as described in relation to FIG. 3. Furthermore, as noted above, the commutation of the windings may be based at least in part on the BEMF voltage/signal generated by the windings of the spindle motor 410.

Figure 5:
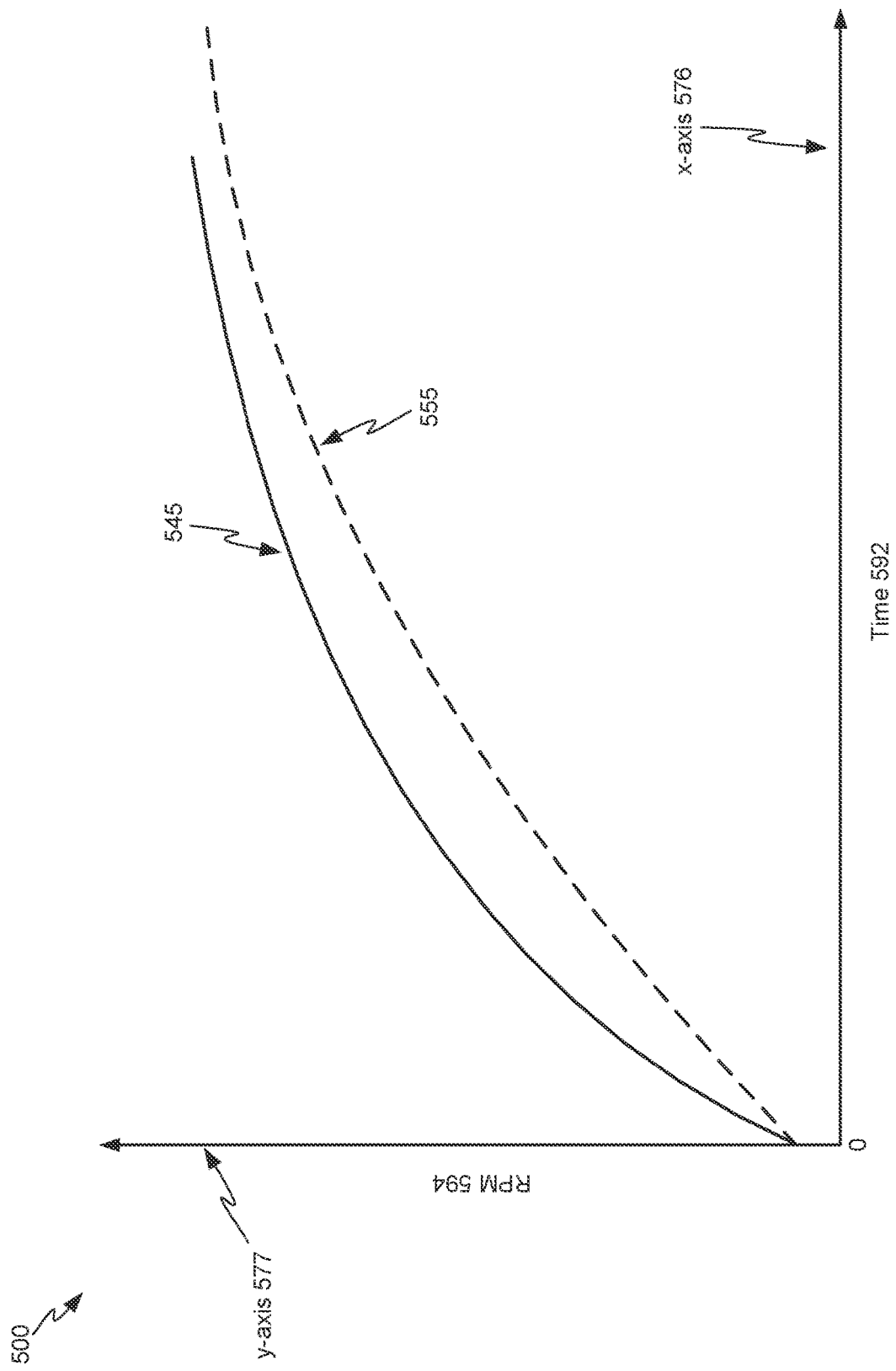
FIG. 5 illustrates a conceptual graph showing revolutions per minute (RPM) against time for different spindle phase currents during spin up of a data storage device, according to various aspects of the disclosure.

FIG. 5 illustrates a conceptual graph 500 showing RPM 594 (on the vertical or y-axis 577) against time 592 (on the horizontal or x-axis 576) for a spindle motor, according to various aspects of the disclosure. Graph 500 shows a first trace 545 corresponding to the RPM of a spindle motor during a spin up routine when a plurality of spindle drivers (e.g., spindle drivers 330-a, 330-b in FIG. 3) are connected in parallel and simultaneously used to commutate the windings (e.g., windings L16, L17, and L18) of the spindle motor (e.g., spindle motor 310). This allows for a higher spin up current to be used, which helps reduce spin up time, as compared to the prior art. Graph 500 also shows a second trace 555 corresponding to the RPM of a spindle motor during a spin up routine when a single spindle driver is used to commutate the windings of the spindle motor. As seen, a faster spin up time (i.e., amount of time required to the target RPM is shorter) can be achieved when a plurality of spindle drivers are used in parallel (trace 545) as compared to the case where a single spindle driver is used (trace 555) during a spin up routine.

Figure 6:
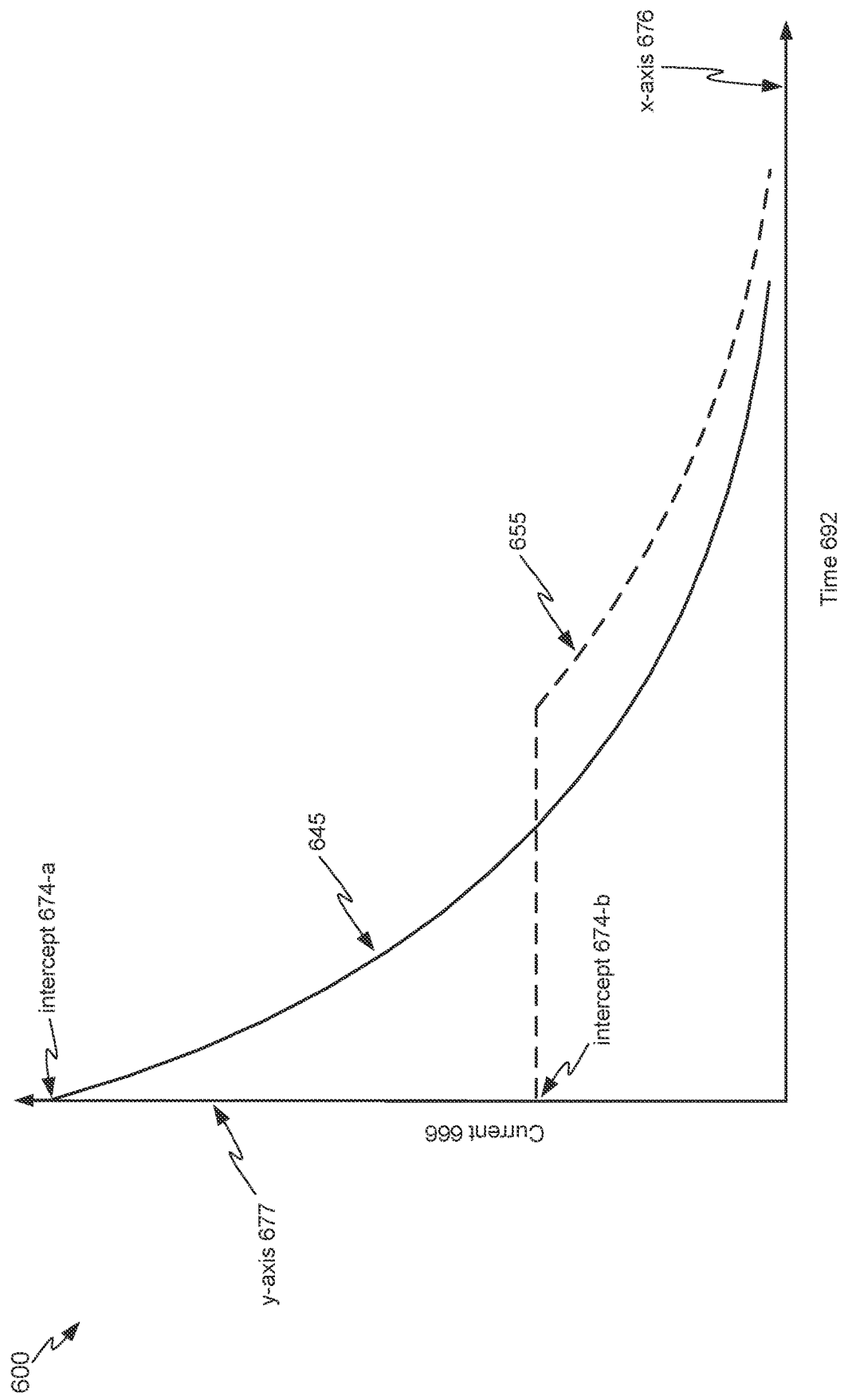
FIG. 6 illustrates a conceptual graph showing spindle phase current against time during a spin up procedure of a data storage device, according to various aspects of the disclosure.

Turning now to FIG. 6, which illustrates a conceptual graph 600 showing spindle phase current 686 (on the vertical or y-axis 677) against time 692 (on the horizontal or x-axis 676) during a spin up procedure/routine of a data storage device, according to various aspects of the disclosure. Graph 600 depicts two traces 646, 655, where trace 645 corresponds to the spindle current during spin up when a plurality of spindle drivers are utilized in parallel to commutate the windings of the spindle motor, while trace 655 corresponds to the spindle current during spin up when a single spindle driver is utilized to commutate the windings of the spindle motor. FIG. 6 also shows intercepts 674-a and 674-b corresponding to the intersections of the traces 645 and 655, respectively, with the y-axis 677. In one non-limiting example, the intercepts 674 may be based on a maximum threshold current that can be supported by the spindle driver(s), the field effect transistors (FETs), or a combination thereof. As an example, if a single spindle driver (or its FETs) can support a maximum current of 'I' amps during spin up, where I=3, 4, etc., then two spindle drivers (or their FETs) may be able to support a maximum current of '2*I' amps, where 2*I=6, 8, etc. In some cases, the magnitude of the intercept 674-a may be around twice that of the intercept 674-b, for instance, when two spindle drivers are used in parallel during spin up. In other cases, however, the intercept 674-a may be more than twice the intercept 674-b, for instance, when more than two spindle drivers are used in parallel.

During spin up, the current 686 gradually drops from a high current (e.g., intercept 674-a) to around 0 amps, as shown by trace 645. Furthermore, when a single spindle driver is used, the current 686 may remain relatively steady (e.g., little deviation from the intercept 674-b) for a first portion of time, followed by a gradual drop from a high current (e.g., intercept 674-b) to around 0 amps, as shown by trace 655.

In some cases, the spindle current is at or near 0 amps following the spin-up routine, for instance, when the RPM of the spindle motor is at or near the target RPM (referred to as "at-speed"). In some embodiments, the spin-up and/or at-speed routines may be open loop, in which case the SoC (e.g., SoC 350) is constantly commutating the spindle motor (e.g., spindle motor 310) through each position based upon the BEMF feedback signal. Alternatively, the spin-up and/or at-speed routines may be controlled closed-loop, as described above in relation to FIG. 4.

Figure 7A:
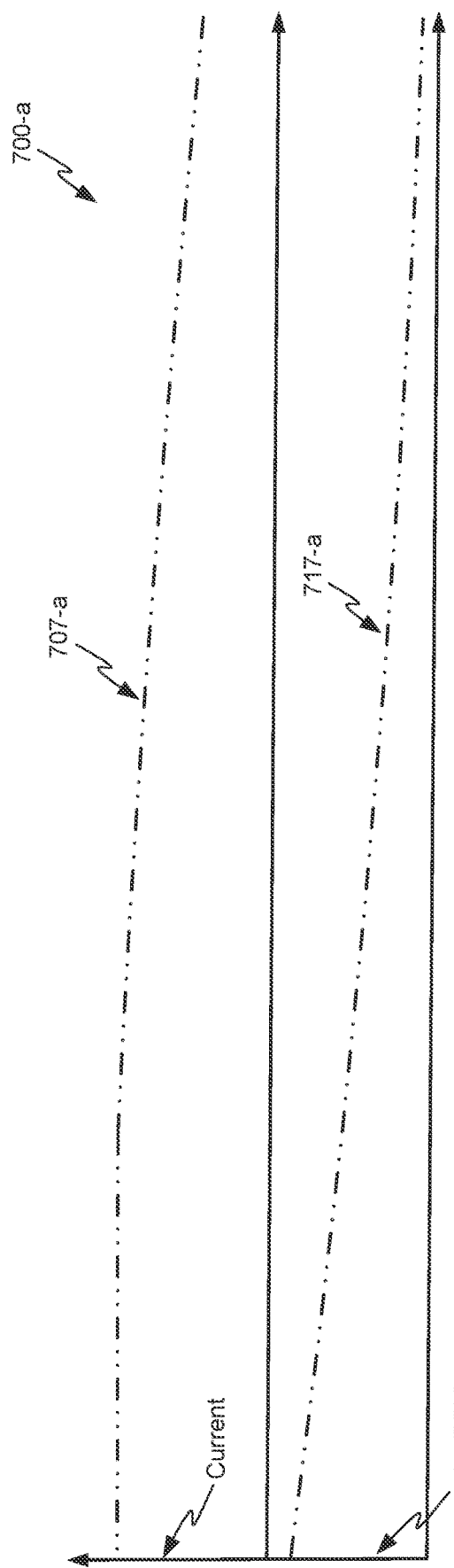
FIG. 7A illustrates a conceptual graph showing current and voltage waveforms against time during a spin down procedure of a data storage device, and when a first spin down current is used, according to various aspects of the disclosure.
Figure 7B:
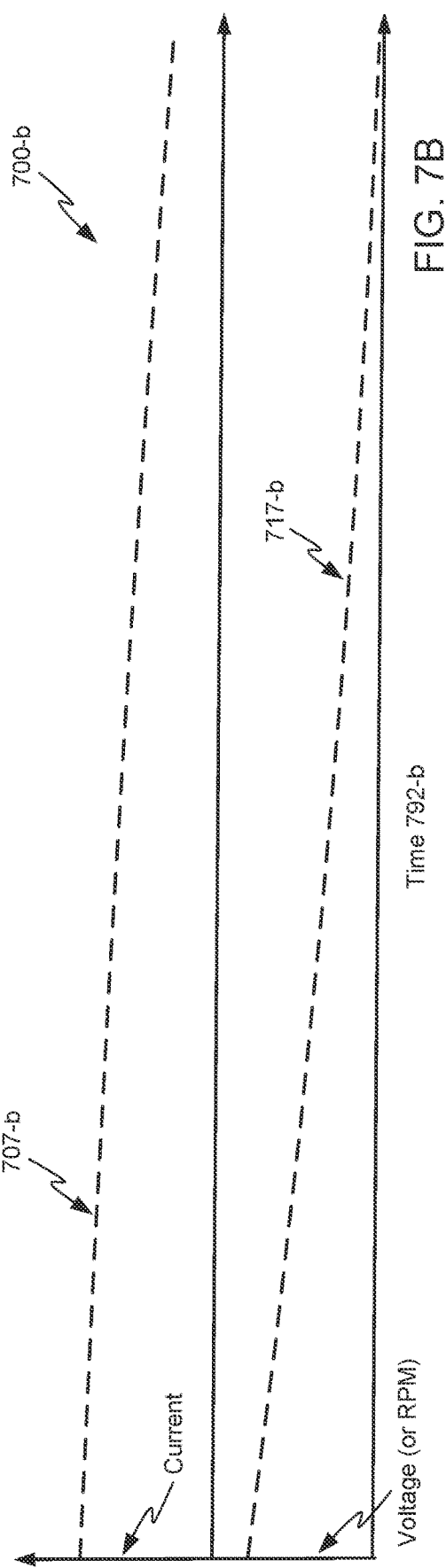
FIG. 7B illustrates a conceptual graph showing current and voltage waveforms against time during a spin down procedure of a data storage device, and when a second spin down current is used, where the second spin down current is higher than the first spin down current in FIG. 7A, according to various aspects of the disclosure.

Turning now to FIGS. 7A and 7B, which illustrate conceptual graphs 700-a and 700-b, respectively, during a spin-down routine, according to various aspects of the disclosure.

FIG. 7A illustrates a conceptual graph 700-a showing spindle current (trace 707-a) and RPM (trace 717-a) against time 792-a when a single spindle driver is utilized, as in the prior art.

FIG. 7B illustrates a conceptual graph 700-b showing spindle current (trace 707-b) and RPM (trace 717-b) against time 792-b when a plurality of spindle drivers are used in parallel, in accordance with aspects of the disclosure. In some cases, the y-axis intercept of trace 707-*b* may be higher than the y-axis intercept of trace 707-*a*, indicating a higher spin-down braking current. In some cases, the y-axis intercept of trace 707-*b* may be around twice (or slightly lower) than the y-axis intercept of trace 707-*a*, for instance, when two spindle drivers are utilized in parallel. Furthermore, the y-axis intercept of traces 707-*a* and 707-*b* may be at or around the same, indicating the initial RPM before the braking current is applied is around the same in both situations.

Similar to the spin-up case, a reduction in spin-down time may be achieved when two or more spindle drivers are connected in parallel and used to brake the spindle motor. In some cases, a higher braking current (e.g., 6 amps instead of 3 amps) can be utilized when multiple spindle drivers are connected in parallel (to the windings of the spindle motor) and used to perform the open-loop brake in parallel. In some cases, the total braking current during spin down may be based in part on the BEMF level. For example, a slightly lower braking current (e.g., 4-5 amps instead of 6 amps) can be employed when the BEMF is below a threshold, and a maximum braking current (e.g., 6 amps) can be employed when the BEMF is above a threshold. In some cases, the maximum braking current ($I_{Brake}$) can be calculated using Ohms-law, e.g., $I_{Brake}=V_{BEMF}$/Spindle Resistance.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SOC), such as SoC 350 in FIG. 3, SoC 450 in FIG. 4. In addition, the control circuitry 22 may include a preamp circuit, where the preamp circuit is implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., shown in FIG. 2C) described herein. The instructions may be stored in any computer-readable medium. In some examples, they may be stored on a non-volatile semiconductor memory device, component, or system external to the microprocessor, or integrated with the microprocessor in the SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method(s), event(s), or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for enhancing spin up and spin down times for data storage devices, and other aspects of this disclosure. Persons skilled in the relevant fields of art will be well-equipped by this disclosure with an understanding and an informed reduction to practice of a wide panoply of further applications, architectures, techniques, and methods for enhancing spin up and spin down times for data storage devices, and other aspects encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A disk drive comprising:
a disk;
a head actuated over the disk;
a spindle motor operable to rotate the disk, wherein the spindle motor comprises a plurality of windings and is coupled to a first spindle driver and a second spindle driver, and wherein the first and the second spindle drivers are coupled in parallel to the plurality of windings; and
one or more processing devices or components configured, individually or in combination, to:
detect a back electromotive force (BEMF) signal corresponding to one or more of a velocity and a position of the spindle motor; and
control, based at least in part on detecting the BEMF signal, commutation of the plurality of windings of the spindle motor using the first spindle driver and the second spindle driver, wherein the first spindle driver and the second spindle driver are used to:
commutate the plurality of windings at or near the same time during one or more of a spin up routine, a spin down routine, and an at-speed routine of the spindle motor; or
sequentially commutate the plurality of windings during one or more of the spin up and the spin down routine of the spindle motor.

2. The disk drive of claim 1, wherein the one or more processing devices or components further comprise, individually or in combination, a system on chip (SoC), and wherein the SoC is configured to communicate with a first power large scale integrated circuit (PLSI) associated with the first spindle driver and a second PLSI associated with the second spindle driver.

3. The disk drive of claim 2, wherein each of the first PLSI and the second PLSI comprises a serial port that is communicatively coupled to a serial port of the SoC.

4. The disk drive of claim 2, wherein the one or more processing devices or components are further configured, individually or in combination, to:
calibrate firmware (FW) to allow the first spindle driver and the second spindle driver to be controlled open-loop using the SoC.

5. The disk drive of claim 1, wherein the first spindle driver comprises a plurality of sets of commutation switches, and wherein each set of commutation switches of the first spindle driver comprises at least two commutation switches and is coupled to one winding of the plurality of windings.

6. The disk drive of claim 5, wherein the second spindle driver comprises a plurality of sets of commutation switches, and wherein each set of commutation switches of the second spindle driver comprises at least two commutation switches and is coupled to one winding of the plurality of windings.

7. The disk drive of claim 1, wherein the spindle motor comprises a plurality of windings, and wherein each of the first spindle driver and the second spindle driver comprises three pairs of commutation switches, and wherein,
each pair of commutation switches of the first and the second spindle drivers is connected to a first end of one winding of the spindle motor, and
a second end of each winding of the spindle motor is connected to a center tap.

8. The disk drive of claim 1, wherein the first spindle driver comprises a spindle driver of a lead power large scale integrated circuit (PLSI) and the second spindle driver comprises a spindle driver of a support PLSI.

9. The disk drive of claim 8, wherein the lead PLSI comprises a plurality of output pins and the support PLSI comprises a plurality of input pins.

10. The disk drive of claim 9, wherein a number of output pins of the lead PLSI is equal to a number of input pins of the support PLSI, and wherein each output pin is tied to one input pin to produce a tied pin pair.

11. The disk drive of claim 10, wherein the first spindle driver and the second spindle driver each comprise a same number of pairs of commutation switches, and wherein the number of output pins and the number of input pins is one of:
equal to one or more of a number of windings of the spindle motor and the number of pairs of commutation switches, or
greater than a number of windings of the spindle motor.

12. The disk drive of claim 9, wherein the spindle motor comprises a plurality of windings, and each of the first spindle driver and the second spindle driver comprises three pairs of commutation switches, each pair of commutation switches coupled to one winding of the spindle motor.

13. The disk drive of claim 12, wherein one of:
the lead PLSI comprises three output pins and the support PLSI comprises three input pins, one output pin for each pair of commutation switches in the first spindle driver and one input pin for each pair of commutation switches in the second spindle driver; or
the lead PLSI comprises six output pins and the support PLSI comprises six input pins, one output pin for each commutation switch in the first spindle driver and one input pin for each commutation switch in the second spindle driver.

14. The disk drive of claim 12, wherein one or more of:
a high signal on a tied pin pair indicates that a commutation switch on a high-side of a corresponding pair of commutation switches should be driven to an ON state and a commutation switch on a low-side of the corresponding pair of commutation switches should be driven to an OFF state;
a low signal on a tied pin pair indicates that a commutation switch on a high-side of a corresponding pair of commutation switches should be driven to an OFF state and a commutation switch on a low-side of the corresponding pair of commutation switches should be driven to an ON state; and
a mid-signal on a tied pin pair places a corresponding pair of commutation switches into a tri-state.

15. The disk drive of claim 9, wherein the first spindle driver of the lead PLSI and the second spindle driver of the support PLSI are driven in parallel and controlled closed-loop, based at least in part on the BEMF signal.

16. The disk drive of claim 1, wherein between actions of:
(1) commutating the plurality of windings at or near the same time during one or more of a spin up routine, a spin down routine, and an at-speed routine of the spindle motor, and
(2) sequentially commutating the plurality of windings during one or more of the spin up and the spin down routine of the spindle motor,
the one or more processing devices or components are further configured, individually or in combination, to control using the first spindle driver and the second spindle driver to perform action (1).

17. The disk drive of claim 1, wherein between actions of:
(1) commutating the plurality of windings at or near the same time during one or more of a spin up routine, a spin down routine, and an at-speed routine of the spindle motor, and
(2) sequentially commutating the plurality of windings during one or more of the spin up and the spin down routine of the spindle motor,
the one or more processing devices or components are further configured, individually or in combination, to control using the first spindle driver and the second spindle driver to perform action (2).

18. The disk drive of claim 1, wherein between actions of:
(1) commutating the plurality of windings at or near the same time during one or more of a spin up routine, a spin down routine, and an at-speed routine of the spindle motor, and
(2) sequentially commutating the plurality of windings during one or more of the spin up and the spin down routine of the spindle motor,
the one or more processing devices or components are further configured, individually or in combination, to control using the first spindle driver and the second spindle driver to perform actions (1) and (2).

19. A method for operating a data storage device, the method comprising:
coupling a first spindle driver and a second spindle driver to a spindle motor, wherein the spindle motor comprises a plurality of windings, and wherein the first and the second spindle drivers are coupled in parallel to the plurality of windings;
detecting a back electromotive force (BEMF) signal corresponding to one or more of a velocity and a position of the spindle motor; and
controlling, based at least in part on detecting the BEMF signal, commutation of the plurality of windings of the spindle motor using the first spindle driver and the second spindle driver, wherein the first spindle driver and the second driver are used to:
commutate the plurality of windings at or near the same time during one or more of a spin up routine, a spin down routine, and an at-speed routine of the spindle motor; or
sequentially commutate the plurality of windings during one or more of the spin up and the spin down routines of the spindle motor.

20. The method of claim 19, wherein the data storage device further comprises a system on chip (SoC) for communicating with a first power large scale integrated circuit (PLSI) associated with the first spindle driver and a second PLSI associated with the second spindle driver, the method further comprising:
calibrating firmware (FW) to enable the first and the second spindle drivers to be controlled open-loop using the SoC.

21. The method of claim 19, wherein the first spindle driver and the second spindle driver are controlled closed-loop, and wherein the controlling comprises driving the first spindle driver and the second spindle driver in parallel.

22. The method of claim 19, wherein between actions of:
(1) commutating the plurality of windings at or near the same time during one or more of a spin up routine, a spin down routine, and an at-speed routine of the spindle motor, and
(2) sequentially commutating the plurality of windings during one or more of the spin up and the spin down routines of the spindle motor,
the first spindle driver and the second spindle driver are used to perform action (1).

23. The method of claim 19, wherein between actions of:
(1) commutating the plurality of windings at or near the same time during one or more of a spin up routine, a spin down routine, and an at-speed routine of the spindle motor, and
(2) sequentially commutating the plurality of windings during one or more of the spin up and the spin down routines of the spindle motor,
the first spindle driver and the second spindle driver are used to perform action (2).

24. The method of claim 19, wherein between actions of:
(1) commutating the plurality of windings at or near the same time during one or more of a spin up routine, a spin down routine, and an at-speed routine of the spindle motor, and
(2) sequentially commutating the plurality of windings during one or more of the spin up and the spin down routines of the spindle motor, the first spindle driver and the second spindle driver are used to perform actions (1) and (2).

25. One or more processing devices or components, comprising, individually or in combination:
    means for detecting a back electromotive force (BEMF) signal corresponding to one or more of a velocity and a position of a spindle motor of a data storage device, wherein the spindle motor comprises a plurality of windings, and wherein the data storage device comprises a first spindle driver and a second spindle driver coupled in parallel to the plurality of windings; and
    means for controlling commutation of the plurality of windings of the spindle motor using the first spindle driver and the second spindle driver, wherein the first spindle driver and the second spindle driver are used to:
        commutate the plurality of windings at or near the same time during one or more of a spin up routine, a spin down routine, and an at-speed routine of the spindle motor; or
        sequentially commutate the plurality of windings during one or more of the spin up and the spin down routines of the spindle motor;
    wherein the first and the second spindle drivers are controlled, based at least in part on detecting the BEMF signal.

26. The one or more processing devices or components of claim 25, wherein the means for controlling comprises one of:
    means for controlling the first and the second spindle drivers using an open-loop control scheme; and
    means for controlling the first and the second spindle drivers using a closed-loop control scheme.

* * * * *